(12) United States Patent
Zikeli et al.

(10) Patent No.: US 10,913,048 B2
(45) Date of Patent: Feb. 9, 2021

(54) PRESSURE-REGULATED MULTI-REACTOR SYSTEM

(71) Applicant: AUROTEC GMBH, Voecklabruck (AT)

(72) Inventors: Stefan Zikeli, Regau (AT); Friedrich Ecker, Timelkam (AT)

(73) Assignee: AUROTEC GMBH, Voecklabruck (AT)

( * ) Notice: Subject to any disclaimer, the term of this patent is extended or adjusted under 35 U.S.C. 154(b) by 1076 days.

(21) Appl. No.: 14/389,133

(22) PCT Filed: Mar. 19, 2013

(86) PCT No.: PCT/EP2013/055693
§ 371 (c)(1),
(2) Date: Sep. 29, 2014

(87) PCT Pub. No.: WO2013/143922
PCT Pub. Date: Oct. 3, 2013

(65) Prior Publication Data
US 2015/0044122 A1    Feb. 12, 2015

(30) Foreign Application Priority Data

Mar. 28, 2012  (EP) .................................. 12161792

(51) Int. Cl.
| | | |
|---|---|---|
| *B01J 3/00* | (2006.01) | |
| *B01J 19/24* | (2006.01) | |
| *B01J 19/32* | (2006.01) | |
| *C01C 3/02* | (2006.01) | |

(52) U.S. Cl.
CPC ............. *B01J 19/245* (2013.01); *B01J 3/006* (2013.01); *B01J 19/2415* (2013.01); *B01J 19/32* (2013.01);
(Continued)

(58) Field of Classification Search
CPC ...................................................... B01D 47/14
See application file for complete search history.

(56) References Cited

U.S. PATENT DOCUMENTS

| | | | | |
|---|---|---|---|---|
| 987,375 A | * | 3/1911 | Kaiser ...................... | B01J 23/40 423/403 |
| 3,639,261 A | * | 2/1972 | Slater ....................... | C01B 3/36 252/373 |

(Continued)

FOREIGN PATENT DOCUMENTS

| | | |
|---|---|---|
| CA | 1102094 | 6/1981 |
| CN | 101318891 A  * | 12/2008 |

(Continued)

OTHER PUBLICATIONS

Definition of "region" by Merriam-Webster. Retrieved from www.merriam-webster.com on Aug. 12, 2019. (Year: 2019).*

(Continued)

*Primary Examiner* — Jennifer A Leung
(74) *Attorney, Agent, or Firm* — Greer, Burns & Crain, Ltd.

(57) ABSTRACT

A device and a method are provided for reacting a starting material in at least two reactors connected to each other, including the reacting of the starting material in a first reactor to a first product, removing the first product from the first reactor using a jet pump, wherein a negative pressure zone of the jet pump is operationally connected to the first reactor, so that the first product of the first reactor moves through the negative pressure zone in a propulsion jet of a propulsion medium of the jet pump, conducting the propulsion medium having the first product into a second reactor, wherein the first product is allowed to react into a second product, separating the second product from the propulsion medium and discharging the separated second product.

17 Claims, 2 Drawing Sheets

(52) U.S. Cl.
CPC .......... *C01C 3/0204* (2013.01); *C01C 3/0208* (2013.01); *B01J 2219/00159* (2013.01)

(56) References Cited

U.S. PATENT DOCUMENTS

| | | | | |
|---|---|---|---|---|
| 4,208,284 A | * | 6/1980 | Pretorius | B01D 15/08 210/767 |
| 4,271,134 A | * | 6/1981 | Teller | B01D 53/34 423/215.5 |
| 4,285,923 A | * | 8/1981 | Bean | C01B 21/50 423/235 |
| 4,719,016 A | | 1/1988 | Storkbaum et al. | |
| 5,131,825 A | | 7/1992 | Bachmann et al. | |
| 5,485,728 A | * | 1/1996 | Dickinson | C02F 11/086 60/648 |
| 6,638,396 B1 | * | 10/2003 | Hogan | C10J 3/18 110/226 |
| 2008/0069759 A1 | * | 3/2008 | Richter | B82Y 30/00 423/447.1 |

FOREIGN PATENT DOCUMENTS

| | | | | |
|---|---|---|---|---|
| CN | 201187012 | | 1/2009 | |
| CN | 201187012 Y | | 1/2009 | |
| CN | 201988203 | | 9/2011 | |
| DE | 1211612 | | 3/1966 | |
| DE | 3540863 | | 7/1987 | |
| GB | 472988 A | * | 10/1937 | ............ C07C 45/88 |
| GB | 662356 A | * | 12/1951 | |
| GB | 693829 A | * | 7/1953 | ............... B01J 6/00 |
| JP | 57088033 | | 6/1982 | |
| JP | S5788033 A | | 6/1982 | |
| JP | H08-253327 A | | 10/1996 | |
| JP | 9137909 | | 5/1997 | |
| JP | H09-137909 A | | 5/1997 | |
| JP | 2001-066031 A | | 3/2001 | |
| JP | 2003-164856 A | | 6/2003 | |
| WO | 2006/022316 A1 | | 3/2006 | |

OTHER PUBLICATIONS

Machine translation for CN 101318891 A, retrieved from Espacenet website Jan. 16-17, 2020 (Year: 2020).*
German Translation of Japanese Examination Report for Patent Application No. 2015-502210 dated Aug. 29, 2016.
Indian Examination Report from Indian Patent Application No. 2242/KOLNP/2014, dated Feb. 25, 2019.

* cited by examiner

PRESSURE-REGULATED MULTI-REACTOR SYSTEM

BACKGROUND

The invention relates to the field of chemical process technology for substances which tend to contaminate installations.

In the course of various chemical reactions, by-products are usually formed in addition to the formation of the desired product. Also products can become unstable under different conditions and also result in the formation of by-products, e.g. by decay or aggregation. Some by-products are capable of damaging reaction systems by their simple presence, adhesion or by reactions with available system parts, e.g. seals, which can only be removed by expensive cleaning or repair. Such cleaning processes can appreciably interrupt production for a long time. It is therefore generally avoided to transport contaminating by-products over fairly long distances in a chemical plant and separate and remove these as quickly as possible. In some cases, e.g. when there is an unstable product, this is not readily possible. In such cases an attempt is made to convert the unstable product directly into a stable end product. This can lead to substantial restrictions in the design of process plants, in particular on the possibility of installing pumps which can easily become contaminated and damaged. These must therefore be avoided or replaced which is frequently associated with unsatisfactory pressure controls.

GB 2 107 311 A relates, for example, to a multi-reactor method for the synthesis of urea from hydrogen and nitrogen at high pressure of 160 bar in both reactor parts. The gases are transported by means of a pump from the first into the second reactor for further reaction.

CA 1102094 relates to methods for desulphurization of sulphur compounds. One variant provides a two-stage process in which the starting substance is initially converted in a hydrogenation reactor into hydrogen sulphide which is passed into a second reactor in which hydrogen sulphide is oxidized with air oxygen. Variable pressures can be set by means of pumps. Such pumps are contaminated by the waste gases of the first reactor.

DE 3540863 C describes a multi-reactor system for phosgenation in which a plurality of reactor tanks are connected by lines with pressure regulating units such as pumps and valves. However, such arrangements can lead to contamination of the installations with toxic or corrosive substances which can require expensive cleaning or repairs following wear.

The problem of harmful chemical substances was identified in EP 0448750. Proposed therein is the chemical or physical treatment of the substances in a special chamber of a dry compression vacuum pump. For example, corrosive gases such as HCl, HF or Hg vapours are bound to activated charcoal or iodized active carbon to protect the pump.

CN 201 187 012 Y describes a system for concentration of black liquor. Water is extracted via a hydraulic ejector. This system is not a multi-reactor system.

CN 201 988 203 U describes a film evaporator which is operated via a hydraulic ejector. This document also describes no multi-reactor system.

DE 35 31 834 C1 relates to a membrane filter arrangement where evaporated permeate is withdrawn by a jet pump. Permeate and the propellant are extracted jointly via a conveying pump and supplied to the jet pump again via a heat exchanger and via a line. No separation of propellant and permeate is provided. Also no multi-reactor system is described therein.

JP 57 088033 A discloses an apparatus for $UO_2F_2$ separation. Initially gaseous $UF_6$ is extracted from a generator via the water jet pump, where $UF_6$ reacts with water to give $UO_2F_2$ and is introduced into an evaporator. In a further step water is extracted by a further pump in order to subsequently separate $UO_2F_2$ by drying. A compact device for producing a negative pressure with downstream reactor is not described here.

JP 9 137909 A describes a complex circulating pump system for pressure regulation and heating of several tanks.

DE 12 11 612 B describes a formamide vacuum method for producing hydrocyanic acid.

SUMMARY

It is an object of the present invention to provide a system for chemical processes which allows a precise and safe pressure regulation and monitoring for the system between several chemical reaction regions.

The invention relates to a device and a method for reaction of a starting material in at least two interconnected reactors, comprising the reacting of the starting material in a first reactor to give a first product, withdrawing the first product from the first reactor by a jet pump, wherein a negative pressure zone of the jet pump is operatively connected to the first reactor, so that the first product of the first reactor passes through the negative pressure zone into a propulsion jet of a propulsion medium of the jet pump, conducting (via a line) the propulsion medium with the first product into a second reactor, wherein the first product is allowed to react to a second product, separating the second product from the propulsion medium and removing the separated second product.

The invention also relates to a device comprising at least two interconnected reactors, suitable for continuous operation with contaminating substances, comprising a first reactor which is connected to a jet pump via a line, wherein the jet pump is suitable for producing a negative pressure in the first reactor, wherein a negative pressure zone of the jet pump is operatively connected to the first reactor via the line, so that during operation a first product fluid of the first reactor passes through the negative pressure zone into a propulsion jet of a propulsion medium of the jet pump and comprising a second reactor in which the propulsion jet is guided for collection of the propulsion medium together with the first product fluid of the propulsion jet and which has an outlet for a second product fluid formed in the second reactor as well as a pump for conveying the propulsion medium from the second reactor for feeding into the jet pump as propulsion medium, wherein the propulsion medium can be separated from the second product fluid in the second reactor. This device is preferably used in the method according to the invention. The following detailed description relates both to the method in which the device can be used and also to the device which can be suitable or adapted for the described method and process parameters. The present invention is further defined as specified in the claims.

Substances are reacted in the reactors in a two-(or multi-) reactor device. Thus, in the first reactor a first product is formed from a starting material. The first product is usually a fluid which can be transported through a line and is designated herein as first product fluid. The starting material can also be a mixture of chemical substances comprising one or more substances reacted in the first reactor and optionally additionally one or more inert (i.e. not reacting here in the first reactor) substances. The starting material can also be a fluid. By using fluids the device according to the invention can be operated continuously where starting material is supplied continuously to the first reactor and first product is removed continuously by means of the jet pump.

Further reactions can occur in the second reactor or already previously through contact with the propulsion medium in the jet pump. A second product is finally removed by the second reactor. Preferably the second product in the second reactor can be separated by a phase separation from the propulsion medium and optionally other substances, with the result that the removable second product is obtained. For example, the second product can be a gas or a solid. Such phase separations have the advantage of simple continuous separability.

The device according to the invention allows a connection of two reactors or reactor regions via a jet pump, whereby different pressures can be regulated. In the first reactor a negative pressure is formed by operation of the jet pump. As a result of this arrangement, it is possible to dispense with moving components which are contaminated by hazardous or harmful chemical substances which can leave the first reactor. As a result the safety and the lifetime of the device are increased and otherwise high maintenance costs are reduced.

Thus, in a preferred embodiment it is provided to keep the line between the first reactor and the jet pump at the inner surface free from moving parts, in particular free from pumps, fans or moving mixers (static mixing elements can naturally be used as required). Outside the line and therefore outside the product flux, naturally any elements can be attached to the line such as, for example, cooling elements or fans. In order to prevent the escape of the first product fluid from the device, the line between the first reactor and the jet pump is preferably a sealed line.

Also in these preferred embodiments, arbitrary inserts which do not introduce any moving parts are possible in the line. Especially for example, a heat exchanger can be provided in the line between the first reactor and the jet pump. A heat exchanger can be used for removing the heat of the first product fluid in order, for example, to adjust the temperature of the first product fluid for the jet pump or the second reactor. It is also possible that a condensate separator lies in the line between the first reactor and the jet pump. As a result, condensate of the first product fluid (in particular as gas) can be separated after the first reactor. A condensate separator can be provided both before or after or both before and after a heat exchanger.

In special preferred embodiments, the first reactor is a reactor which is provided for operation at high temperatures. Such a reactor can, for example, be a thermolysis or a pyrolysis reactor. Combustion reactors are also possible. For example, the first reactor is provided for temperatures of at least 300° C., preferably at least 350° C. or at least 400° C., at least 450° C. or also at least 500° C. Reaction heat can be produced in the reactor or be supplied from outside, e.g. via a heating element. A suitable reactor can be equipped through the selection of suitable heat-stable materials. In addition, a heating element can be provided for heating to the desired temperature. High-temperature reactions are, for example, the thermolysis of carboxylic acid amides (e.g. as in DE 2325749 A1, WO 2009/062681, WO 2009/062897 or DE 10 2007 034 715 A1), the production of acrolein from glycerin gas (e.g. as described in U.S. Pat. No. 7,951,978 B2), the oxidation of organic molecules (e.g. as described in US 2001/306788 B2). The heating element can, for example, be an electrical resistance heater or preferably an inductive heater (e.g. as described in DE69215358 T2, DE 2712728 A1 or EP 363066 B1). The first reactor is preferably a tube or multi-tube reactor. For further enlargement of the surface area, the first reactor can have various inserts such as, for example, Raschig rings which are preferably also heatable (e.g. inductively). The inner surface of the first reactor, optionally also the inserts, can have a catalyst layer for the respectively desired reaction, for example, an iron or iron oxide layer for the thermolysis of formamide. Preferably the starting material is a carboxylic acid amide. In general, the reaction in the first reactor can be any chemical reaction such as, for example, a covalent reaction, redox reaction, complex forming reaction, an acid-base reaction or a solid reaction. Preferably it is a high temperature reaction at over 300° C.

Preferably the first product is a thermolysis or pyrolysis product and the first reactor is a thermolysis or pyrolysis reactor. The first product can be a desired end product, chemical intermediate stages, possibly obtained in combination with undesired by-products.

A negative pressure is produced in the first reactor by the jet pump and the first product fluid is sucked into the jet pump. "Negative pressure" should be understood relatively herein. The negative pressure in the first reactor is relative to the pressure of a supply line (initial pressure) in the first reactor. The negative pressure can, but need not, be an absolute negative pressure, i.e. a negative pressure relative to atmospheric pressure. This is dependent on the pressure of the supply line. For example, it is also possible to maintain absolute positive pressures in the first reactor. The pressure and the inflow of starting material are either influenced by the supply of starting-material-containing medium through the supply line or alternatively or in combination by a separate supply of a medium, preferably an inert medium or air, into the interior of the first reactor. This supply is regulated by the inlet pressure and by corresponding pressure resistances, e.g. pressure valves, before entry into the interior of the first reactor.

During operation the pressure in the first reactor is preferably an absolute negative pressure, preferably an absolute pressure of up to 500 hPa, particularly preferably of up to 250 hPa, especially preferably in the range of 80 hPa to 200 hPa. The propellant of the jet pump is preferably suitable for producing these negative pressures, i.e. at operating temperature the vapour pressure of the propulsion medium is sufficiently low. Preferably the propulsion medium is suitable for producing an absolute negative pressure of 500 hPa or less, or of 400 hPa or less, preferably of 250 hPa or less, e.g. at at least 50° C., preferably at at least 70° C.

The negative pressure ultimately set in the first reactor is controlled by the jet pump. A usual jet pump, for example, has a propulsion nozzle from which a propulsion medium emerges at high speed into a mixing chamber. In this case, according to the Bernoulli and Venturi laws, a dynamic pressure drop is formed. In the mixing chamber the propulsion jet impinges upon a suction medium, in operation the first product fluid which is thereby accelerated. As a result, a pressure drop is formed in the suction medium, i.e. a suction effect, in the negative pressure zone of the mixing chamber, which optionally propagates via the line in the direction of the first reactor and from there conveys the first product. The negative pressure is influenced by the flow rate. The propellant jet with the suction medium can be directed into a collecting nozzle from which the media can be removed from the jet pump, optionally via a diffuser. In preferred embodiments the negative pressure in the first reactor is regulated by means of the propellant flux. Optionally the pressure can be additionally monitored by active pressure measurement in the first reactor, thereby enabling a precise pressure control. The pressure can also be controlled without pressure measurement by reference to known flow rates and resulting pressures. Preferably the propulsion medium is a fluid. Fluids have higher densities than gases, with the result that the acceleration of the suction medium (first product) can be configured more efficiently. Preferably the density of the propulsion medium is at least 1 kg/m$^3$, e.g. at least 1.1 kg/m$^3$. In the case of hot process gases, the use of a jet pump to produce the negative pressure is advantageous since on the one hand, the negative pressure can easily be adjusted and on the other hand, the jet pump is not influenced by the hot process gas. Also jet pumps having high corrosion resistance can be used.

From the jet pump the first product together with the propulsion medium—in particular mixed with the propulsion medium—enters into the second reactor. This can either be accomplished directly following, by connection to the jet pump or to an outlet of the same, or via another line. The pressure can be configured to be variable in the second reactor. In particular, the pressure of the first reactor is a negative pressure with respect to the second reactor or the pressure of the second reactor is a positive pressure compared to the first reactor. Preferably atmospheric pressure prevails in the second reactor. Atmospheric pressure can be pressure-neutralized for example by means of a surge tank or a siphon. The second reactor can be configured as a container for the propellant which can be supplied and removed continuously. By means of a surge tank, a positive or negative pressure with respect to the atmosphere can be avoided and on the other hand the surge tank can at the same time form an overflow protection means. The second reactor can be supplemented with further propulsion medium on reaching the minimal level. Preferably the second reactor is divided into an (upper) reaction region in which the reaction takes place, e.g. at a porous matrix surface and a storage region located thereunder for the propulsion medium. Naturally the reaction can take place already in the jet pump.

In the second reactor the second product is formed from the first product. This reaction can take place with components of the propulsion medium and/or with a solid or liquid catalyst. Preferably large surface areas are provided for this, e.g. by surface-enlarging inserts or shapes of the second reactor. Particularly preferred is a porous matrix through which the propulsion medium can trickle. Gases can thereby be efficiently separated or chemical surface reactions can be accelerated. The reaction in the second reactor can be a chemical reaction such as, for example, a covalent reaction, redox reaction, a complex forming reaction, an acid-base reaction, a precipitation, a solid reaction, and/or a physical process such as a phase separation where especially the combination of chemical and physical processes is preferred. The second product can be the desired end product and can be obtained after separation from the propulsion medium. Alternatively, further reactors can also be located downstream. Simple separations take place due to phase separation, for example, the second product can be a gas. A gas can easily be separated from the propulsion medium in the second reactor by degassing. Preferably the temperature in the second reactor is between 0° C. and 100° C.

The propulsion medium can be adapted to the process requirements so that the process parameters such as temperature and pressure in the first reactor can be regulated by means of a specific adjustment of pH values, conductivities and from the analysis of emerging cracked gas.

If the propulsion medium needs to be chemically matched (pH adjustment) or renewed after use, this can be accomplished by means of a supply unit for new propulsion medium.

Preferably the propellant contains an acid or base. The reaction in the second reactor can comprise an acid-base reaction, preferably the propellant contains an acid. In a special example the reaction in the second reactor is a salt formation of an undesired by-product of the first product fluid and a gas formation of a desired second product. The undesired by-product thus remains in the second reactor and can be continuously removed by renewing the propellant. In a specific case the first product contains ammonia as undesired by-product and cyanide as desired end product (e.g. during the thermolysis of formamide in the first reactor). As a result of an acid in the second reactor (or in the propulsion medium), gaseous ammonia is converted to an ammonium ion by protonation by the acid. Dissolved cyanide is reacted to give hydrocyanic acid and expelled in gaseous form. For this purpose it is advantageous if the acid in the second reactor is a strong acid as the desired second product. Examples of desired product acids are, for example, HF (pKa 3.14), formic acid (pKa 3.75), acetic acid (pKa 4.75), hydrogen sulphide (pKa 6.92), HCN (pKa 9.40). In particular a strong or stronger acid such as $H_2SO_4$, HCl is provided in the propellant to form these (easily separable) acids. In other cases the second product can be a base. In these cases it can be advantageous to provide a stronger base in the second reactor or as propellant which can convert a base salt into the free base as product. An example is ammonia gas (pKb 4.75). To form ammonia, for example, a strong base such as NaOH can be provided in the propellant. Another reaction in the second reactor is, for example, the formation of solid precipitation products which can also be separated by phase separation from a (fluid) propulsion medium and then removed. Preferably the propulsion medium contains a protic solvent, preferably water. Examples for propulsion media are aqueous solutions, in particular of a base or acid, for example, of sulphuric acid, sodium hydroxide solution or calcium hydroxide.

For the degassing and phase separation of gaseous second products, a gas stream such as an inert gas, for example, can be introduced in the second reactor which does not react with the substances of the second reactor such as, for example, nitrogen. A filter can also be provided before leading off the second product fluid.

The propellant can be led from the second reactor directly via a pump back into the jet pump. The flow rate of the propulsion medium and therefore the negative pressure in the first reactor can be controlled by the pump control.

In special embodiments, in particular those with an acid or base in the second reactor, the invention relates to a method comprising the extraction of the acid or base fluid from a negative pressure container of a device in which a negative pressure is produced by a jet pump, where a propellant is guided as propulsion jet through the propulsion nozzle of the jet pump with the result that as a result of the negative pressure formed in the jet pump, the propellant with the acid or base fluid (is optionally mixed and) is guided together in the propulsion jet into a propulsion medium container, separation of the acid or base fluid from the propellant, removal of the propellant from the propulsion medium container via a pump into the jet pump, escape of the acid or base fluid where, if the fluid is an acid fluid, the propellant comprises an optionally strong acid or of the fluid is a base fluid, the propellant comprises an optionally strong base in order to prevent an ionization of the acid or base of the acid or base fluid. The acid or base of the propulsion medium prevents any ionization (e.g. by deprotonation of the acid or protonation of the base of the fluid), so that a better separation, in particular a phase separation of the fluid and the propellant is made possible. Preferably the acid or base fluid is a gas which can be removed efficiently from the propellant without salt formation.

Another reaction which can take place in the first, in the second or in both reactors is, for example, the Suzuki reaction.

The invention further relates to a device comprising a negative pressure container and a jet pump suitable for generating a negative pressure in the negative pressure container and for withdrawing an acid or base fluid from the negative pressure container, wherein a negative pressure zone (mixing chamber) of the jet pump is operatively connected to the negative pressure container so that during operation the fluid of the negative pressure container passes through the negative pressure zone into a propulsion jet of a propulsion medium of the jet pump and comprises a propulsion medium container into which the propulsion jet is guided for collecting the propulsion medium together with the fluid of the propulsion jet, comprising a pump for conveying the propulsion medium from the propulsion medium container for feeding into the jet pump as propulsion medium, where the propulsion medium with the acid or base fluid is separable, in particular phase separable, the propulsion medium comprises an acid or base and the propellant container has an outlet for the phase of the acid or base fluid. Especially the acid or base fluid is a product of a chemical reaction which is formed in the negative pressure container as first reactor. Such a product is, for example, HCN which can be formed, for example, by the Andrussow method, the Degussa BMA method or the BASF method. As a result of the invention the dissolved acid or base is expelled as desired product from the propellant or prevents dissolving, with the result that the acid or base can be rapidly separated and removed again directly from the propellant container.

BRIEF DESCRIPTION OF THE DRAWINGS

The present invention is explained in detail by the following figures and examples without being limited to these embodiments of the invention.

Figures.

DETAILED DESCRIPTION

Figure 1:
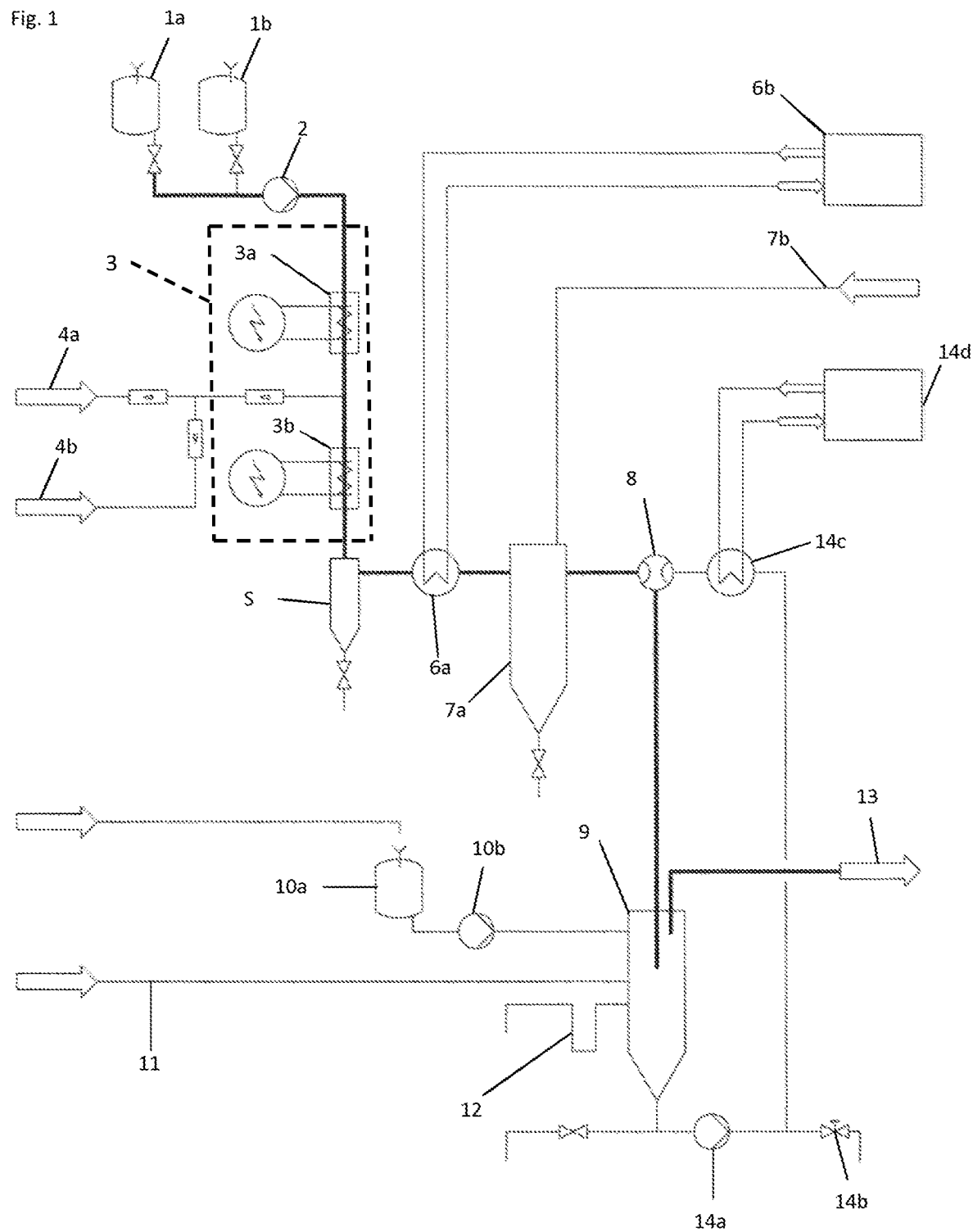
FIG. 1 shows a schematic structure of a device according to the invention comprising two chemical reactors.

FIG. 1 shows a schematic structure of a device according to the invention comprising two chemical reactors (3 and 9). Starting materials are provided by the containers 1a and 1b and conveyed by a pump 2 and fed into the reactor 3. The reactor 3 has an inductively heated pre-heating zone 3a in which the starting materials are pre-heated still below the reaction temperature. In the inductively heated reaction zone 3b the starting materials are heated to reaction temperature and react to produce the first product. Between the pre-heating zone 3a and the reaction zone 3b, another fluid, e.g. a reaction gas such as an oxygen-containing gas 4a and/or inert gas 4b, can be supplied. The first product is fed into a first condensate separator 5, a heat exchanger 6a which is temperature-controlled with medium 6b and fed into a second condensate separator 7a. In the second condensate separator 7a a gas 7b can be introduced. The first product is sucked into the jet pump 8 and introduced into the second reactor 9. The second reactor 9 has a supply of propulsion medium which is conveyed from a storage container 10a via a pump 10b. For gas separation flushing gas can flow in via a gas line 11. A surge tank 12 is provided for pressure neutralization. Product gas flows out via a line 13. The propellant is conveyed via a pump 14a from the second reactor 9 and can if necessary be released via the valve 14b. In a heat exchanger 14c the propulsion medium can optionally be brought to reaction temperature before introducing into the jet pump 8. The heat exchanger 14c is temperature-controlled by means of a medium 14d.

Figure 2:
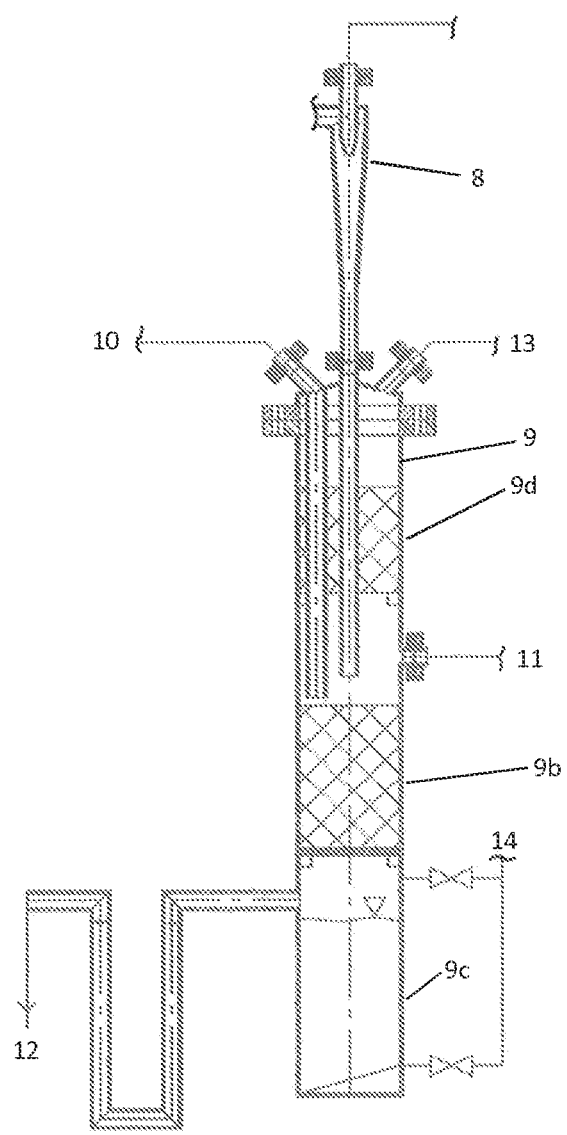
FIG. 2 shows a second reactor with connected jet pump as shown in FIG. 1.

FIG. 2 shows a second reactor 9 with connected jet pump 8 as shown in FIG. 1 with depicted reaction region 9b with a surface-enlarging matrix and a container region 9c for the propulsion medium. A filter region 9d contains a filter which can further purify the product gas removed via the line 13.

Example 1: Thermolysis of Formamide

The experiments were carried out with a reactor system as described above (description of example according to FIGS. 1 and 2).

A water-formamide mixture is introduced into a tube reactor as starting material. In the pre-heating zone the mixed starting materials are initially heated to ~200° C. and in the reaction zones heated to the cracking temperature of formamide at ~490° C. A pressure of 200 mbar is set by means of the jet pump. In order that this negative pressure does not reach the starting material container, a pressure or flow throttler is located before the inlet into the reactor. The process vacuum required for the thermolysis process is produced with a jet pump 8.

Air and nitrogen are introduced into the reactor between pre-heating zone and reactor zones.

Since thermolysis processes take place at very high temperatures and the downstream system parts can or must be operated at lower temperatures, the first product gas can be supplied via a heat exchanger 6a for cooling and/or for heat recovery. The propellant of the jet pump can also be temperature-controlled in such a manner. Any accumulating process condensate is collected in the condensate container 7a and removed.

The propulsion medium jet of the jet pump leads into a second reactor 9 which contains the propulsion medium 10, which can also be a reaction medium and is supplied anew via the circulating pump 14 of the jet pump 8. The heat exchanger 14c located in the system circuit removes the heat still contained in the process gas and the heat dissipated via the circulating pump 14a. The heat exchangers 14c and 6a can be supplied with corresponding heat exchanger fluids or regulated via thermostats 6b and 14d of the system.

Usually the process gas of formamide cracking has a temperature of ~100° C. after the heat exchanger which is further cooled by contact with the propulsion medium (about 60-80° C.)

65% sulphuric acid in water is used as propulsion medium, which has a high boiling point and is suitable for producing a negative pressure at 80° C.

At the gas inlet 7b air or nitrogen is blown in, at the gas inlet 11 nitrogen in order to expel pure product gas (HCN) and degas the propulsion medium.

The following process and product parameters were determined:
Formamide used: 0.085 kg/h
Amount of cracked gas evolved: 0.085 kg/h
Yield 97%
Formamide: 0.003 kg/h
Hydrocyanic acid: 0.046 kg/h
Water: 0.031 kg/h
Ammonia: 0.002 kg/h
Carbon monoxide: 0.004 kg/h
Propulsion jet flow rate: 1200 l/h
Propulsion jet pressure: 6 bar
Propulsion jet temperature: 80° C.
Suction pressure: 200 mbar

The invention claimed is:

1. A device including at least two interconnected reactors, suitable for continuous operation with contaminating substances, comprising:
a first reactor connected to a jet pump via a line, wherein in a pre-heating zone, starting materials are heated to a temperature below a reaction temperature, and in a reaction zone, the starting materials are heated to the reaction temperature, wherein the jet pump is configured for producing a negative pressure in the first reactor, and wherein a negative pressure zone of the jet pump is operatively connected to the first reactor via the line, so that during operation, a first product fluid of the first reactor passes through the negative pressure zone into a propulsion jet of the jet pump; and
a second reactor having a longitudinal axis and including a reaction region and a container region, wherein the propulsion jet extends along said longitudinal axis and at least partially within said second reactor to introduce a propulsion medium together with the first product fluid of the propulsion jet into said reaction region of said second reactor, said reaction region including a porous, surface enlarging matrix configured to form a second product fluid, and said container region configured to store said propulsion medium separated from said second product fluid, said second reactor including an outlet for said second product fluid formed in said second reactor and a pump for conveying the propulsion medium from said container region for feeding into the jet pump as propulsion medium.

2. The device according to claim 1, wherein the line between the first reactor and the jet pump at the inner surface is free from moving parts.

3. The device according to claim 1, wherein the line between the first reactor and the jet pump is a sealed line.

4. The device according to claim 1, further comprising a cooling element attached to the line between the first reactor and the jet pump.

5. The device according to claim 1, further comprising a heat exchanger in the line between the first reactor and the jet pump.

6. The device according to claim 1, further comprising a condensate separator in the line between the first reactor and the jet pump.

7. The device according to claim 1, wherein the first reactor is provided for temperatures of at least 300° C.

8. The device according to claim 1, wherein in said first reactor, the propulsion medium is configured for producing an absolute negative pressure equal to or less than 500 hPa at a temperature of at least 50° C.

9. The device according to claim 1, wherein a flux of the propulsion medium regulates the negative pressure in the first reactor.

10. The device according to claim 1, wherein the first product fluid is a thermolysis or pyrolysis product and the first reactor is a thermolysis or pyrolysis reactor.

11. The device according to claim 1, wherein the propulsion medium contains an acid or base or the reaction in the second reactor comprises an acid-base reaction.

12. The device according to claim 1, wherein the second product fluid is a gas.

13. The device according to claim 2, wherein the moving parts are pumps, fans or mixers.

14. The device according to claim 1, wherein in said first reactor, the propulsion medium is configured for producing an absolute negative pressure equal to or less than 250 hPa at a temperature of at least 70° C.

15. The device according to claim 1, wherein said first reactor includes a supply line configured to receive a supply regulated by inlet pressure and at least one pressure valve.

16. The device according to claim 1, wherein said second reactor further comprises a filter region configured to filter said second product fluid.

17. A device including at least two interconnected reactors, suitable for continuous operation with contaminating substances, comprising:
a first reactor connected to a jet pump via a line, wherein in a pre-heating zone, starting materials are heated to a temperature below a reaction temperature, and in a reaction zone, the starting materials are heated to the reaction temperature, wherein the jet pump is configured for producing a negative pressure in the first reactor, and wherein a negative pressure zone of the jet pump is operatively connected to the first reactor via the line, so that during operation, a first product fluid of the first reactor passes through the negative pressure zone into a propulsion jet of the jet pump;
a second reactor having a longitudinal axis and including a reaction region and a container region, wherein the propulsion jet extends along said longitudinal axis and at least partially within said second reactor to introduce a propulsion medium together with the first product fluid of the propulsion jet into said reaction region of said second reactor, said reaction region configured to form a second product fluid and said container region configured to store said propulsion medium separated from said second product fluid, said second reactor including an outlet for said second product fluid formed in said second reactor as well as a pump for conveying the propulsion medium from said container region for feeding into the jet pump as propulsion medium; and
a condensate separator in the line between the first reactor and the jet pump.

* * * * *